(12) United States Patent
Kurian et al.

(10) Patent No.: US 11,120,463 B2
(45) Date of Patent: Sep. 14, 2021

(54) SECONDARY TIERED PLATFORM FOR AUXILIARY RESOURCE APPLICATION

(71) Applicant: BANK OF AMERICA CORPORATION, Charlotte, NC (US)

(72) Inventors: Manu Jacob Kurian, Dallas, TX (US); Victoria L. Dravneek, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 15 days.

(21) Appl. No.: 16/505,863

(22) Filed: Jul. 9, 2019

(65) Prior Publication Data

US 2021/0012369 A1 Jan. 14, 2021

(51) Int. Cl.
*G06Q 30/00* (2012.01)
*G06Q 30/02* (2012.01)
*G06Q 20/06* (2012.01)

(52) U.S. Cl.
CPC ..... *G06Q 30/0229* (2013.01); *G06Q 20/0655* (2013.01); *G06Q 30/0233* (2013.01)

(58) Field of Classification Search
CPC .................................................. G06Q 20/0655
See application file for complete search history.

(56) References Cited

U.S. PATENT DOCUMENTS

| | | | |
|---|---|---|---|
| 6,820,061 B2 | 11/2004 | Postrel | |
| 6,829,586 B2 | 12/2004 | Postrel | |
| 7,742,943 B2 | 6/2010 | Postrel | |
| 7,765,124 B2 | 7/2010 | Postrel | |
| 7,941,367 B2 | 5/2011 | Bishop et al. | |
| 7,945,514 B1 | 5/2011 | Sanders et al. | |
| 8,458,016 B1 | 6/2013 | Medina, III et al. | |
| 8,695,875 B1 | 4/2014 | Segura | |
| 2005/0080727 A1* | 4/2005 | Postrel | G06Q 20/10 705/39 |
| 2007/0038515 A1 | 2/2007 | Postrel | |
| 2013/0030889 A1 | 1/2013 | Davich et al. | |
| 2013/0144706 A1 | 6/2013 | Qawami et al. | |
| 2013/0231994 A1* | 9/2013 | Antonucci | G07F 7/1016 705/14.28 |
| 2015/0032521 A1 | 1/2015 | Calman et al. | |
| 2015/0227957 A1 | 8/2015 | Bradley et al. | |
| 2019/0026755 A1* | 1/2019 | Fordyce, III | G06Q 30/02 |

* cited by examiner

*Primary Examiner* — Alvin L Brown
(74) *Attorney, Agent, or Firm* — Michael A. Springs; Moore & Van Allen PLLC; Nicholas C. Russell

(57) ABSTRACT

Embodiments of the invention are directed to a system, method, or computer program product for a universal auxiliary resources platform allowing access to, distribution of, and exchange of all user auxiliary resources. Converting or scaling the auxiliary resources across the platform occurs for similar value presentation. Thus allowing for transmission of auxiliary resources in real time to satisfy at least a portion of a standard resource transaction. Furthermore, the platform allows for the exchange of auxiliary resources across users based on user set term adjustment.

17 Claims, 6 Drawing Sheets

SECONDARY TIERED PLATFORM FOR AUXILIARY RESOURCE APPLICATION

BACKGROUND

In the technology landscapes, users regularly access entity applications to perform functions associated with the entity and the providing and maintaining of auxiliary resources. That being said, errors still occur in entity applications that disrupt user interaction and processing within the application. As such, there exists a need for an auxiliary resource platform.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In some embodiments, the invention provides a system for a secondary tiered platform for auxiliary resource storage, exchange, and deployment for third party resource satisfaction.

Currently, auxiliary resources are associated with various resource distribution devices, resource accounts, or the like. As advancements occur, more and more deferred resource are being provided as rewards for user appreciation, actions, or the like. The invention comprises a universal auxiliary resources platform that allows access to all user auxiliary resources and allows the user to apply the auxiliary resources across various applications. Doing so, the system may convert or scale the auxiliary resources across the platform such that they are valued the same as when received. For example, auxiliary resources from Entity A may have a value of X, while auxiliary resources from Entity B may have a true value of Y. When the system applies both sets of auxiliary resources to the same future action, they maintain their original true value.

Furthermore, the system allows for transmission of auxiliary resources in real time to complete standard resource transaction. In this way, the auxiliary resources associated with the user on the platform may act as a secondary tier virtual resource account for transaction fulfillment or partial transaction fulfillment.

Along with transaction fulfillment, the platform allows for the user to lend or exchange auxiliary resources across users. In some embodiments, the lending may be exchanged anonymously across the platform. The user may be able to provide an amount of auxiliary resources they desire to exchange and include a percentage interest rate associated with the exchange. A second user may accept the exchange and the interest rate terms. The platform may distribute the auxiliary resources to the second user upon acceptance. This way, the user can set up terms for exchanging between users. For example, if a user is planning on using auxiliary resources a year from now, the user can exchange or lend the user's auxiliary resources now, with the terms of getting re-payment with interest before the user's planned use of the auxiliary resources.

Embodiments of the present invention address these and/or other needs by providing an innovative system, method and computer program product for a universal auxiliary resource platform, the invention comprises generating a unique identification for a user authorized on the auxiliary resource platform; extracting and storing user acquired auxiliary resources within a user account associated with the unique identification for the user on the auxiliary resource platform; allowing user access to the auxiliary resource platform via a user facing virtual system; processing user instruction for exchange and terms associated with the exchange or process instructions for real-time processing of a third party transaction using auxiliary resources to provide at least a portion of the resource requirements; and completing user instruction by providing exchange or resource distribution to third party.

In some embodiments, processing user instruction for exchange and terms associated with the exchange further comprises allowing the user to select terms for anonymous distribution of auxiliary resources to other users on the auxiliary resource platform for a term with interest. In some embodiments, processing user instruction for real-time processing of the third party transaction using auxiliary resources further comprises transmitting a true value to a third party for completion of a standard transaction in real-time using auxiliary resources.

In some embodiments, the invention further comprises pooling one or more users into a single pooled account for multiple users to access and provide user instructions for real-time processing via the pooled account.

In some embodiments, the invention further comprises identifying a true value for the acquired auxiliary resources, wherein the true value for the acquired auxiliary resources may include a percentage or money value for each of the auxiliary resources.

In some embodiments, extracting and storing user acquired auxiliary resources further comprises extracting user acquired auxiliary resources from third party entities and user input. In some embodiments, extracting and storing user acquired auxiliary resources further comprises continually updating user acquired auxiliary resources on the user account.

In some embodiments, generating a unique identification for a user authorized on the auxiliary resource platform further comprises enrolling and authenticating the user onto the auxiliary resource platform, wherein the unique identification for the user is associated with an account on the auxiliary resource platform storing user auxiliary resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
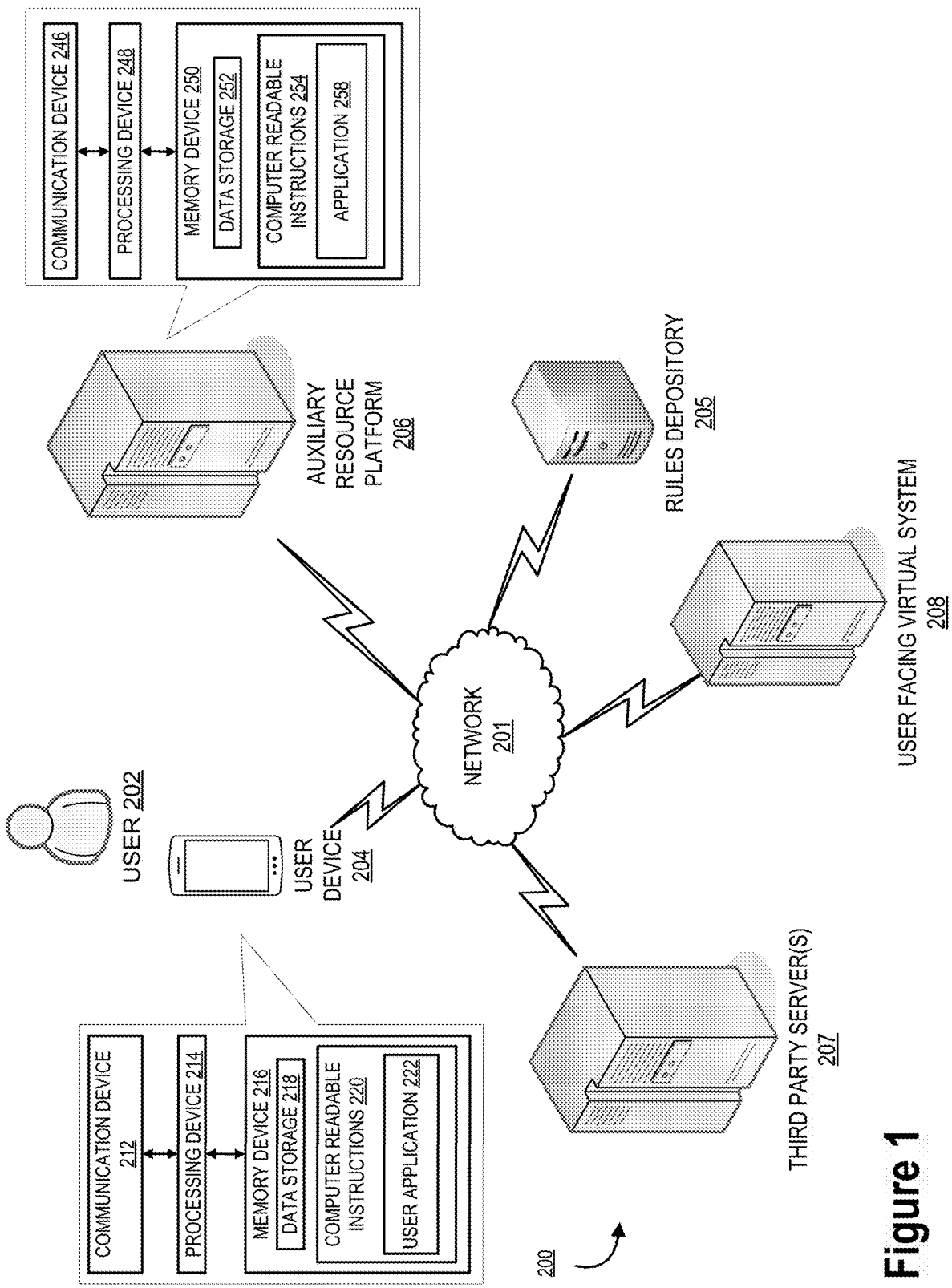
Figure 2:
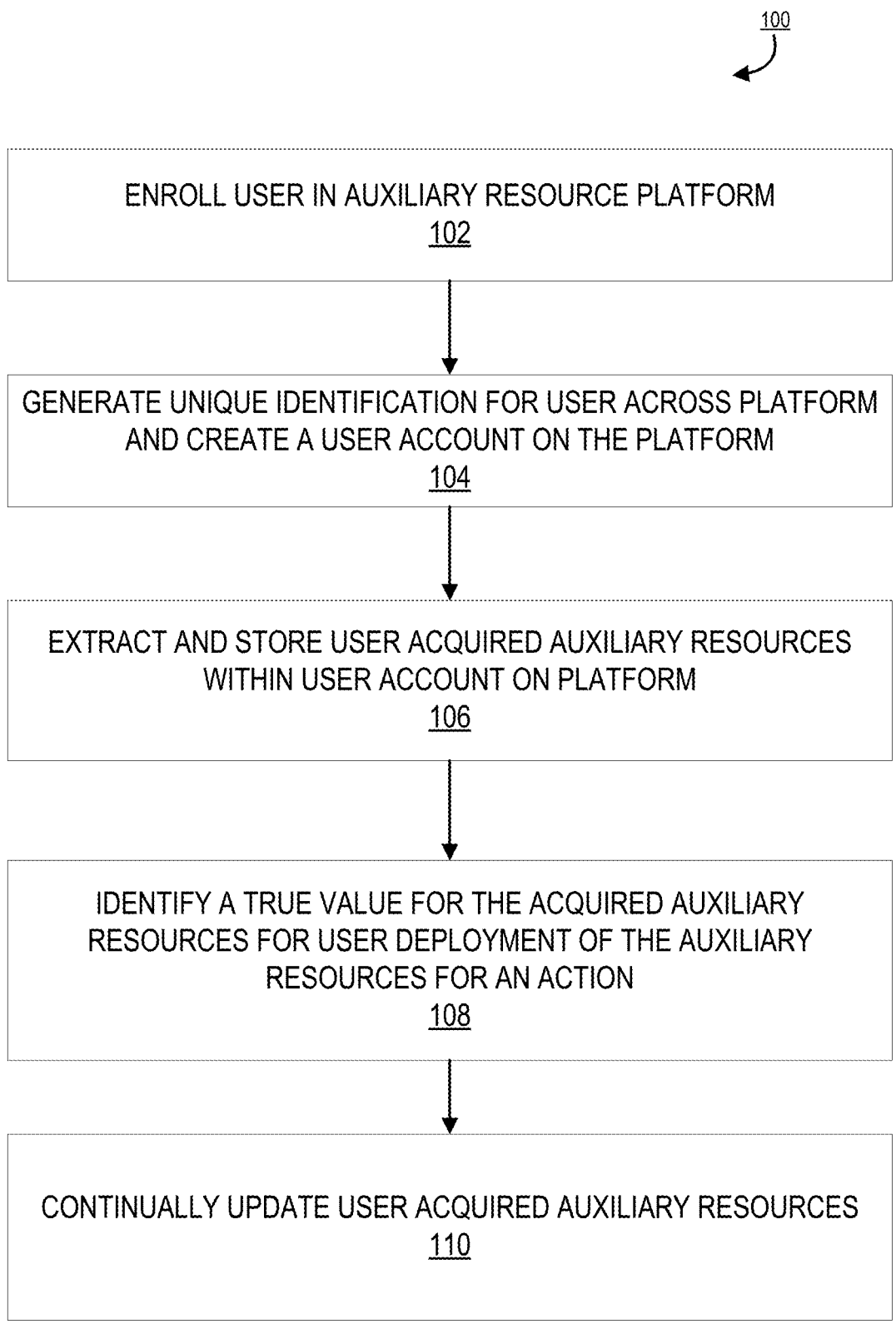
Figure 3:
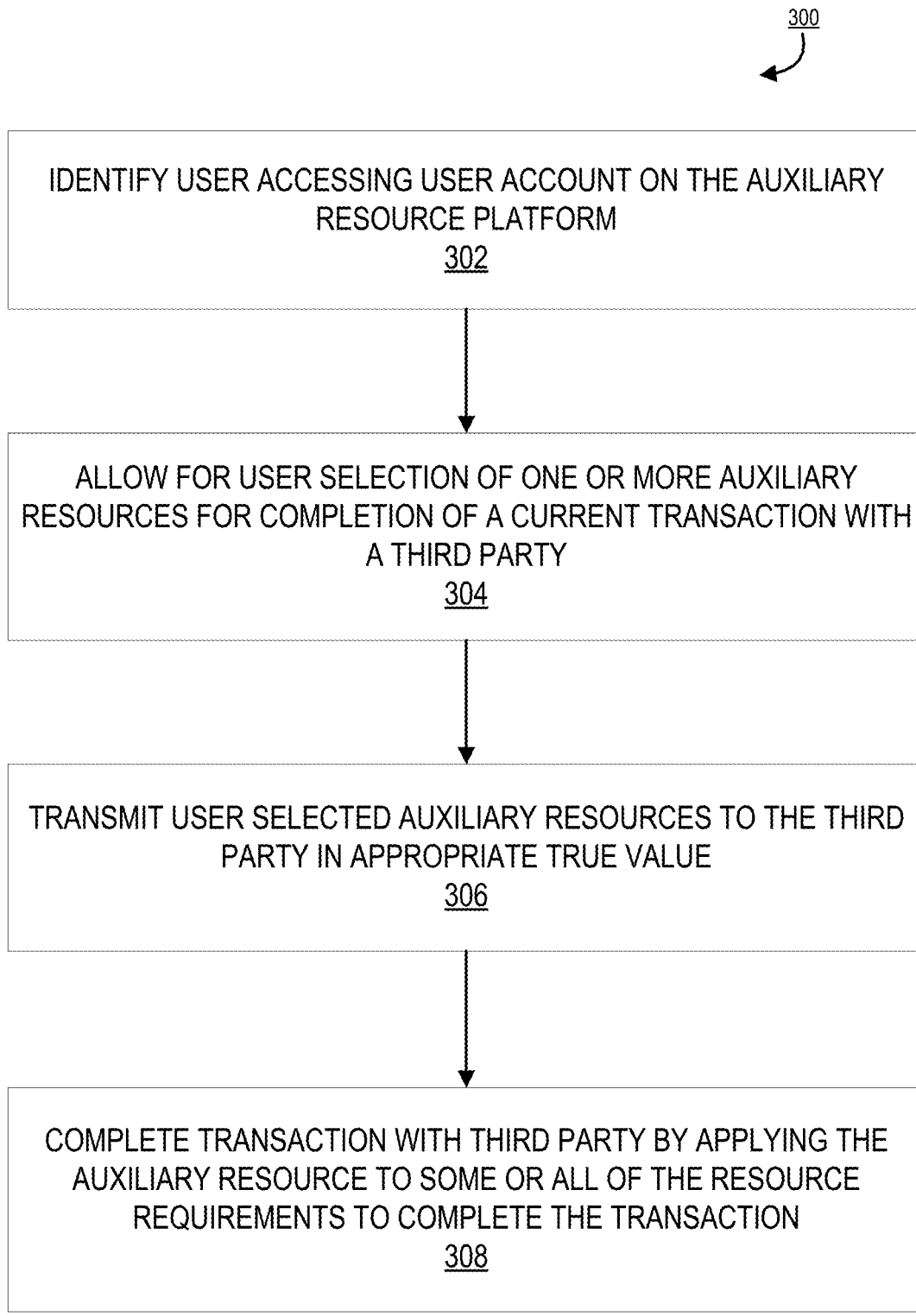
Figure 4:
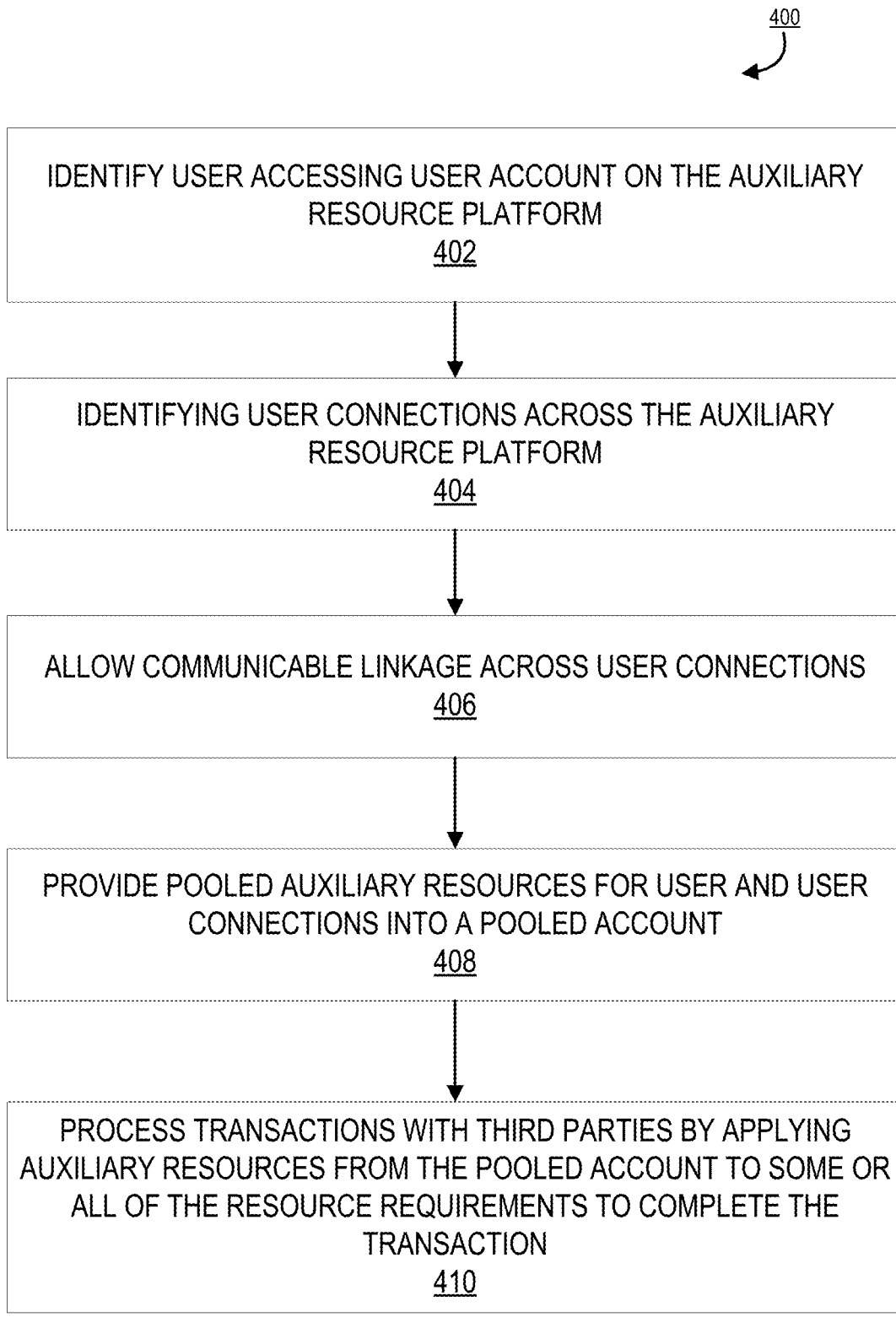
Figure 5:
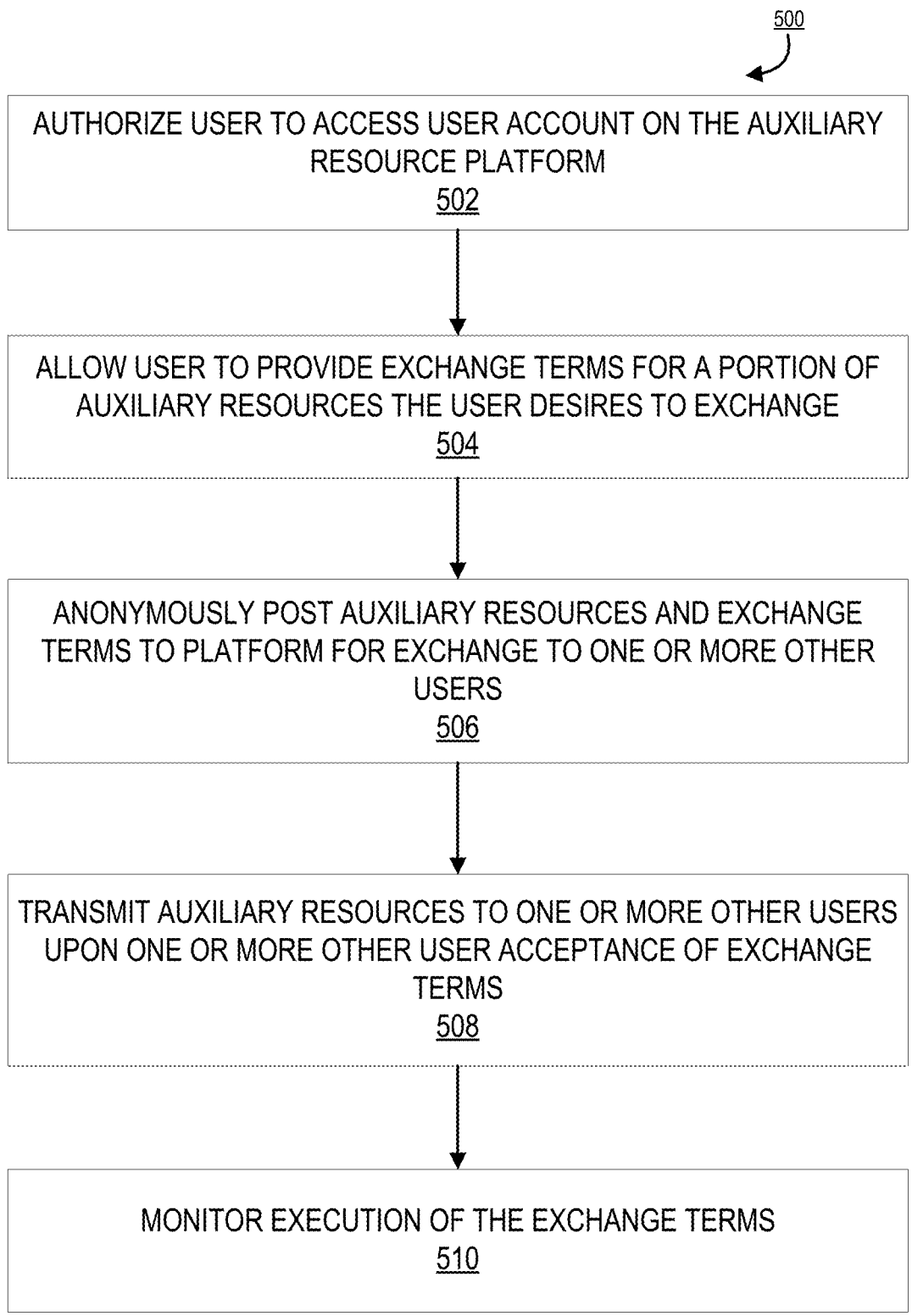
Figure 6:
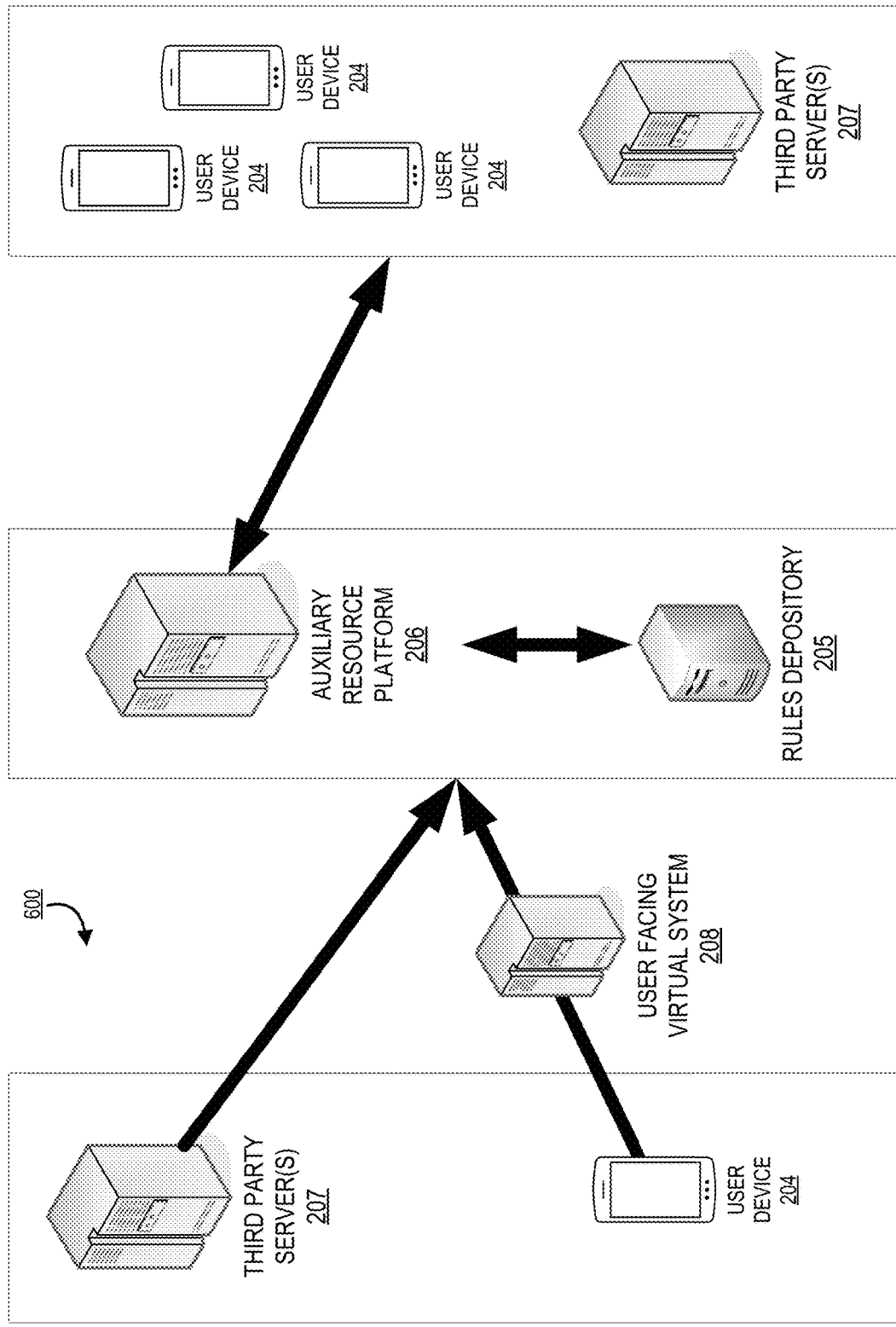

Having thus described embodiments of the invention in general terms, reference will now be made to the accompanying drawings, wherein:

FIG. 1 provides a secondary tiered auxiliary resource application system environment, in accordance with one embodiment of the present invention;

FIG. 2 provides a high level process flow illustrating auxiliary resource platform utilization, in accordance with one embodiment of the present invention;

FIG. 3 provides a process flow illustrating auxiliary resource platform utilization for transaction completion, in accordance with one embodiment of the present invention;

FIG. 4 provides a process flow illustrating auxiliary resource platform utilization for sharing or pooling auxiliary resources across the auxiliary resource platform, in accordance with one embodiment of the present invention;

FIG. 5 provides a process flow illustrating auxiliary resource platform utilization for exchanging auxiliary resources across the auxiliary resource platform, in accordance with one embodiment of the present invention; and FIG. 6 provides a process flow illustrating data transmission across the secondary tiered auxiliary resource application system environment, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any customer of an entity or individual that interacts with an entity. The user may interact with an entity as a customer, such as a customer purchasing a product or service. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "technology activity" may include a transaction for a product or service from a merchant. A "transaction" or "resource distribution" refers to any communication between a user and an entity to transfer funds for the purchasing or selling of a product or service. A transaction may refer to a purchase of goods or services, a return of goods or services, a payment transaction, a credit transaction, or other interaction involving a user's account. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Further, the term "payment credential" or "payment vehicle" or "resource vehicle" as used herein, may refer to any of, but is not limited to refers to any of, but is not limited to, a physical, electronic (e.g., digital), or virtual transaction vehicle that can be used to transfer resources, such as money, make a payment (for a service or good), withdraw money, redeem or use loyalty points, use or redeem coupons, gain access to physical or virtual resources, and similar or related transactions. For example, in some embodiments, the payment vehicle is a bank card issued by a bank which a customer may use to perform purchase transactions. However, in other embodiments, the payment vehicle is a virtual debit card housed in a mobile device of the customer, which can be used to electronically interact with an ATM or the like to perform financial transactions. Thus, it will be understood that the payment vehicle can be embodied as an apparatus (e.g., a physical card, a mobile device, or the like), or as a virtual transaction mechanism (e.g., a digital transaction device, digital wallet, a virtual display of a transaction device, or the like). The payment vehicle may be an unrestricted resource. Unrestricted resources, as used herein may be any resource that is not restricted for transaction. In this way, the unrestricted resources may be applied to any transaction for purchase of a product or service.

In some embodiments, the term auxiliary resource or auxiliary resources are one or more deferred resources received by a user as a reward or gift for an action, such as a transaction, travel, or the like that may be applied toward a future action by the user to minimize a resource cost associated with the future action.

Currently, auxiliary resources are associated with various resource distribution devices, resource accounts, or the like. As advancements occur, more and more deferred resource are being provided as rewards for user appreciation, actions, or the like.

The invention comprises a universal auxiliary resources platform that allows access to all user auxiliary resources and allows the user to apply the auxiliary resources across various applications. Doing so, the system may convert or scale the auxiliary resources across the platform such that they are valued the same as when received. For example, auxiliary resources from Entity A may have a value of X, while auxiliary resources from Entity B may have a true value of Y. When the system applies both sets of auxiliary resources to the same future action, they maintain their original true value.

Furthermore, the system allows for transmission of auxiliary resources in real time to complete standard resource transaction. In this way, the auxiliary resources associated with the user on the platform may act as a secondary tier virtual resource account for transaction fulfillment or partial transaction fulfillment.

Along with transaction fulfillment, the platform allows for the user to lend or exchange auxiliary resources across users. In some embodiments, the lending may be exchanged anonymously across the platform. The user may be able to provide an amount of auxiliary resources they desire to exchange and include a percentage interest rate associated with the exchange. A second user may accept the exchange and the interest rate terms. The platform may distribute the auxiliary resources to the second user upon acceptance. This way, the user can set up terms for exchanging between users. For example, if a user is planning on using auxiliary resources a year from now, the user can exchange or lend the user's auxiliary resources now, with the terms of getting re-payment with interest before the user's planned use of the auxiliary resources.

FIG. 1 provides a secondary tiered auxiliary resource application system environment 200, in accordance with one embodiment of the present invention. FIG. 1 provides the system environment 200 for which the distributive network system with specialized data feeds associated with an interconnected resource distribution and retention network. FIG. 1 provides a unique system that includes specialized servers and system communicably linked across a distributive network of nodes required to perform the functions described herein.

As illustrated in FIG. 1, the user facing virtual system 208 is operatively coupled, via a network 201 to the user device 204, rules depository 205, third party servers 207, and to the auxiliary resource platform 206. In this way, the user facing virtual system 208 can send information to and receive information from the user device 204, rules depository 205, third party servers 207, and the auxiliary resource platform 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has one or more user devices 204. The user 202 may be a customer of an entity or third party associated with the auxiliary resource platform 206 and/or the third party server 207. The user 202 may obtain one or more auxiliary resources from the entity or third party. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the auxiliary resource platform 206, the user facing virtual system 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the auxiliary resource platform 206.

As further illustrated in FIG. 1, the auxiliary resource platform 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the user facing virtual system 208, the third party server 207, the rules depository 205, and the user device 204. As such, the communication device 246 generally comprises a modem, server, or other device for communicating with other devices on the network 201.

As further illustrated in FIG. 1, the auxiliary resource platform 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the auxiliary resource platform 206 the memory device 250 stores an application 258. In one embodiment of the invention, the application 258 may associate with applications having computer-executable program code. Furthermore, the auxiliary resource platform 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more user facing virtual system 208, third party servers 207, rules depository 205, and/or user device 204.

As illustrated in FIG. 1, the third party server 207 is connected to the user facing virtual system 208, user device 204, rules depository 205, and auxiliary resource platform 206. The third party server 207 has the same or similar components as described above with respect to the user device 204 and the auxiliary resource platform 206. While only one third party server 207 is illustrated in FIG. 1, it is understood that multiple third party servers 207 may make up the system environment 200. The third party server 207 may be associated with one or more financial institutions, entities, or the like.

As illustrated in FIG. 1, the rules depository 205 is connected to the user facing virtual system 208, user device 204, third party server 207, and auxiliary resource platform 206. The rules depository 205 has the same or similar components as described above with respect to the user device 204 and the auxiliary resource platform 206. While only one rules depository 205 is illustrated in FIG. 1, it is understood that multiple rules depository 205 may make up the system environment 200.

The rules depository 205 stores rules for storage, true value of the auxiliary resource, terms for exchanges, and the like. In this way, the rules depository 205 may store step by step instructions for applying auxiliary resources and/or the terms for auxiliary resource exchange.

The rules depository 205 may be connected to the auxiliary resource platform 206 via the network 201 for the auxiliary resource platform 206 to perform a search of the rules depository 205 for identification of the specific rules for application to the auxiliary resources prior to deployment of the resources. Furthermore, the rules depository 205 may communicate with the same network protocol and compatibility with the user facing virtual system 208 for deployment of the rules to the user 202 via user facing virtual system 208 deployment of the rules on the user device 204.

As illustrated in FIG. 1, the user facing virtual system 208 is connected to the third party server 207, user device 204, rules depository 205, and auxiliary resource platform 206. The user facing virtual system 208 may be associated with the auxiliary resource platform 206. The user facing virtual system 208 has the same or similar components as described above with respect to the user device 204 and the auxiliary resource platform 206. While only one user facing virtual system 208 is illustrated in FIG. 1, it is understood that multiple user facing virtual system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The user facing virtual system 208 may generally include a processing device communicably coupled to devices as a memory device, output devices, input devices, a network interface, a power source, one or more chips, and the like. The user facing virtual system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the user facing virtual system 208 described herein.

The user facing virtual system 208 furthermore provides for establishing intelligent, proactive and responsive communication with a user, comprising a multi-channel cognitive resource platform for performing electronic activities in an integrated manner from a single interface. The user facing virtual system 208 is also configured for adapting to the user's natural communication and its various modes by allowing seamless switching between communication channels/mediums in real time or near real time.

The user facing virtual system 208 features include: User Interface Navigation and Activity Implementation, Cognitive, Intuitive and Anticipatory features and Electronic activity integration features.

The user facing virtual system 208 is configured to receive, recognize and interpret these linguistic phenomena of the user input and perform user activities accordingly. In this regard, the user facing virtual system 208 is configured for natural language processing and computational linguistics. Based on analyzing the received activity input, the user facing virtual system 208 is configured to determine the user activity that the user seeks to perform. Here, in general, the user facing virtual system 208 may parse the activity input from the user to detect one or more words that make up the activity input from the user. The user facing virtual system 208 may then analyze words to determine the user activity. For example, the user facing virtual system 208 may receive the following voice activity input from the user: "Pay my utility bill of February month." The user facing virtual system 208 may then analyze the one or more words to determine that the caller wants to pay a bill, for example, based on identifying keywords such as, "pay" and "bill". The user facing virtual system 208 may then proceed to perform the bill payment through the central user interface.

Specifically, based on receiving the activity input from the user, in some instances, the user facing virtual system 208 is configured to generate a parse tree based on detected one or more words and/or the detected keywords. A parse tree is a data structure that allows the user facing virtual system 208 to accurately analyze activity input. For example, the parse tree may indicate the various language structures, such as clauses, phrases, subjects, verbs, and objects in a spoken statement and identify the words in each language structure. The user facing virtual system 208 may analyze the parse tree to determine the user activity to be performed and the intent of the user and also to determine any parameters provided by the user for an invoked service. The user facing virtual system 208 may invoke another application, a service, an activity functionality and the like based on its analysis of parse tree.

The user facing virtual system 208 is configured for initiate presentation of a central user interface of the multi-channel cognitive resource application stored on the user device. The user facing virtual system 208 may receive user input. For example, this input may be received via an audio communication channel and/or a textual communication channel. The user facing virtual system 208 may be configured to interpret and transform, seamlessly and in real-time, one medium to another for presentation on the central user interface (for example, speech to text, text to speech and the like). The user facing virtual system 208 may present the received activity input from the user in a textual format. The user facing virtual system 208 may similarly respond to the user input, as indicated by the output, in natural language. In addition, the user facing virtual system 208 may present one or more interactive elements for facilitating the activity, which are embedded, integrated into, or overlaid over the central user interface. These interactive elements may be actuated by tactile input (touch commands and other gestures), audio commands or textual input from the user. These interactive elements may be extracted from other pertinent applications, such as resource applications, discussed previously.

In addition, the user facing virtual system 208 is intuitive and is configured to hold complex and branched conversations with the user, in the pursuit of completing one or more user activities. In this regard, the user facing virtual system 208 is configured to detect and conduct branched conversations using intelligent complex path looping. In some instances, the user facing virtual system 208 may identify a suitable conversation path for completion of a user initiated activity, and proceed to request information accordingly. For example, for a user activity of making reservations at a restaurant, the user facing virtual system 208 may determine a conversation path comprising requesting the cuisine of the restaurant, presenting one or more restaurants associated with the cuisine located in the user's vicinity, receiving a selection of a particular restaurant, receiving a time for the reservation and the number of people for the reservation, and the like. Subsequently, the user facing virtual system 208 may automatically make reservations for the user at the chosen restaurant. These conversation paths are typically natural language conversational forms of the user activity events described previously, and may be determined by the user facing virtual system 208, after or in conjunction with determining the one or more discrete activity events.

In addition, the intelligent complex path looping of the invention enables the user facing virtual system 208 to loop back to the original conversation path for completion of the activity in the instances where the user digresses or the conversation branches out.

Furthermore, the user facing virtual system 208 may include an enhanced resource sharing management application, is configured to function as an intelligent personal assistant and resource navigator and is configured to perform one or more resource activities by harnessing the functionality of multiple applications resident on the user device, for example, functionality of a resource sharing application and another resource activity application may be proactively provided on a single interface, for example, via interfaces overlaid over each other.

Here, in some instances, the central user interface is a computer human interface, and specifically a natural language user interface for receiving user input (for example, for creating, selecting and modifying data/functionality), presenting information regarding user activities, providing output to the user, and otherwise communicating with the user in a natural language of the user. The natural language of the user comprise linguistic phenomena such as verbs, phrases and clauses that are associated with the natural language of the user. The user facing virtual system 208 is configured to receive, recognize and interpret these linguistic phenomena of the user input and perform user activities accordingly. In this regard, the user facing virtual system 208 is configured for natural language processing and computational linguistics. In many instances, the user facing virtual system 208 is intuitive, and is configured to anticipate user requirements, data required for a particular activity and the like, and request activity data from the user accordingly.

In particular, the user facing virtual system 208 is configured to present an integrated central user interface for communicating with the user using audio, visual, and/or textual natural speech conversations with the user, for execution of one or more user activities such as resource sharing and allocation, communicating and performing associated resource activities and functions, and for integrating the functionality of multiple applications (e.g., a resource sharing application such as a resource availability/surplus identification and allocation application for renting dwellings, and a resource activity application such as a financial application, an offer application and/or a personal assistant application) in a single interface, without requiring the user to access the multiple applications individually and be proficient in their operation.

The personal digital assistant feature of system is intuitive and is configured to hold complex and branched conversations with the user, in the pursuit of completing one or more resource activities. In this regard, the user facing virtual system 208 is configured to detect and conduct branched conversations using intelligent complex path looping. In some instances, the user facing virtual system 208 may identify a suitable conversation path for completion of a user initiated activity, and proceed to request information accordingly.

In some embodiments, the system may provide a new payment vehicle to the user in the form of payment vehicles via the auxiliary resources the user has available on the platform.

FIG. 2 provides a high level process flow illustrating auxiliary resource platform utilization 100, in accordance with one embodiment of the present invention. As illustrated in block 102, the process 100 is initiated by enrolling a user in the auxiliary resource platform. As illustrated in block 104, enrollment may provide the user with an account on the auxiliary resource platform, in this way, the platform will generate a unique identification for the user across the platform and create the user account on the platform. As such, the user may have a user account on the platform including an account number and also a unique identification across the platform.

Next, as illustrated in block 106, the process 100 continues by extracting and storing user acquired auxiliary resources within the user account on the auxiliary resource platform. The user may have acquired auxiliary resources from various third party entities based on transactions with the entity, travel with the entity, rewards, points, or the like. The platform may extract the user acquired auxiliary resources from the third party servers or entity servers. In other embodiments, the user may provide the platform with the user acquired auxiliary resources.

Once received, the platform stores the user acquired auxiliary resources in the user account on the platform. As such, the auxiliary resources are available on the platform under the user account upon user authentication. Furthermore, the account houses auxiliary resources from multiple different entities, locations, and the like for a single location for visualization and utilization of user acquired auxiliary resources.

As illustrated in block 108, the process 100 continues by identifying a true value for the acquired auxiliary resources. As such, with a true value, the platform may allow for the user to trade, distribution, or otherwise utilize any auxiliary resources from any entity for an action. The true value may be determined based on the entity associated with the auxiliary resources. As such, the platform may determine the value the entity issuing the auxiliary resources places on the auxiliary resources. For example, each resource may be a percentage off a transaction, a portion of a dollar amount used for a transaction, a mile for air travel, or the like. In some embodiments, the true value may be fluid. In some embodiments, the true value may be a higher value for the issuing entity than for other entities. In some embodiments, the true value may be determined by an entity receiving the auxiliary resources as payment for a transaction.

Finally, as illustrated in block 110, the process 100 is completed by continually updating the user account with user acquired auxiliary resources.

FIG. 3 provides a process flow illustrating auxiliary resource platform utilization for transaction completion 300, in accordance with one embodiment of the present invention. As illustrated in block 302, the process 300 is initiated by identifying a user accessing the user account on the auxiliary resource platform. This may be a user authenticating into the account via providing the platform with authentication credentials.

Next, as illustrated in block 304, the process 300 continues by allowing for the user to select one or more auxiliary resources for completion of a current transaction with an entity. As such, the user may be in the process of transacting with an entity, such as via e-commerce or brink-and-mortar entity location. The user may desire to utilize one or more auxiliary resources in order to satisfy at least a portion of the resources required for completing the transaction. The auxiliary resources available may be illustrated to the user in true value, such that the true value will be reflected upon utilization for the transaction. The platform may display the user's available auxiliary resources in real-time via a user device across the user facing virtual system. The user may select one or more of the auxiliary resources to apply to the current transaction. The platform may convert and determine the true value for the auxiliary resources selected for the specific entity associated with the current transaction.

Once the user selected one or more auxiliary resources to apply to the current transaction, the platform may identify the true value for that particular entity and transmit the user selected auxiliary resources to the third party in the appropriate true value as at least a portion of the payment for the transaction, as illustrated in block 306. In this way, the platform allows a user to utilize auxiliary resources to be applied to a current transaction irrespective of the entity the user is performing the transaction with. As such, the process 300 is completed by completing the transaction with the entity by applying the auxiliary resources to some or all of the resource requirements to complete the transaction, as illustrated in block 308. Thus, allowing the auxiliary resources to be applied to at least a portion of the transaction resource requirements for the user.

FIG. 4 provides a process flow illustrating auxiliary resource platform utilization for sharing or pooling auxiliary resources across the auxiliary resource platform 400, in accordance with one embodiment of the present invention. As illustrated in block 402, the process 400 is initiated by identifying a user accessing a user account on the auxiliary resource platform. As such, the user may have logged into the auxiliary resource platform and authorized to gain access to the user account on the platform.

Next, as illustrated in block 404, the process 400 continues by identifying user connections across the auxiliary resource platform. In this way, the platform may recognize other individual users that the user is connecting with across the platform. These may include friends, family, or the like that may also have accounts on the platform.

The system may generate and allow for a communicable linkage between and across the user and their connections, as illustrated in block 406. As such, the system may allow for communicable linkage for communication between users across the platform to create a community of users.

As illustrated in block 408, the process 400 continues by providing a pooled auxiliary resource account for the user and selected user connections on the platform. In this way, a user may pool their resources with another user, such as family members (parent/child), in order to create a family or pooled auxiliary resource account on the platform. This way, any authorized user on the pooled account may be able to utilize the resources for a transaction, may contribute resources to the account, or the like. The pooled auxiliary resource account pools resources obtained by the users of the pooled account into a single account for access by each user of the pooled account. The users may utilize the pooled account for transactions, exchanges, or the like.

Next, as illustrated in block 410, the process 400 continues by processing transactions with entities by applying user selected auxiliary resources from the pooled account to some or all of the resource requirements to complete a transaction. In this way, an authorized user associated with the pooled auxiliary resource account may utilized the auxiliary resources on the account to perform a transaction. In some embodiments, each user may have rules that limit the amount or type of auxiliary resources that may be used by each authorized user in the pooled account. In this way, in some embodiments, the platform may convert the auxiliary resources into a true value and provide that true value to the entity to apply the true value of the auxiliary resource towards the total resource amount required to complete the transaction with the entity.

FIG. 5 provides a process flow illustrating auxiliary resource platform utilization for exchanging auxiliary resources across the auxiliary resource platform 500, in accordance with one embodiment of the present invention. As illustrated in block 502, the process 500 is initiated by authorizing the user to access user account on the auxiliary resource platform. Once the user is authorized to gain access to the user account on the auxiliary resource platform, the user is allowed to provide auxiliary resources for exchange or loan to other users on the platform. The user may select the terms of the exchange or loan, the amount of auxiliary resources for the exchange or loan, and the like. The exchange may be performed via the platform and anonymously. In some embodiments, the exchange may be anonymous by using the user identification to perform the exchange. In some embodiments, the exchange may be anonymous by the platform completely removing the user information associated with the exchange and keeping an internal ledger of the exchange terms.

As illustrated in block 504, the process 500 continues by allowing the user to provide exchange terms for a selected portion of the auxiliary resources the user desires to present for exchange. In this way, the user may desire to provide auxiliary resource of their own to exchange or loan to one or more other users on the platform. As such, the user may not need the auxiliary resources at this time, may be saving auxiliary resource for a later transaction, or the like. Furthermore, the user may be able to set the terms of the exchange for the user's auxiliary resources. The terms may include a duration of a loan of auxiliary resources, an interest rate for payback of the provided auxiliary resources, or an alternative payback arrangement set by the user. The platform may process the terms and confirm the terms and duration of the auxiliary resource loan.

As illustrated in block 506, the process 500 continues by anonymously posting the auxiliary resources and exchange terms to the platform for exchange from the user to one or more other users. In this way, the exchange can be made to a single user or multiple users up the other user acceptance of the terms and timeline for repayment of the auxiliary resources on the exchange.

Once one or more other users accept the terms and timeline for the user's auxiliary resources on the exchange, the platform may transmit the auxiliary resources to the one or more other users upon the acceptance of those terms and conditions, as illustrated in block 508.

Finally, as illustrated in block 510, the process 500 is completed by monitoring the execution of the exchange terms by the other user and repayment of the auxiliary resources exchange according to those terms. The platform may extract auxiliary resources from the other user if the terms of the exchange are not met.

FIG. 6 provides a process flow illustrating data transmission across the secondary tiered auxiliary resource application system environment 600, in accordance with one embodiment of the present invention. As illustrated, the process 600 includes third party servers 207 and user devices 204 providing the auxiliary resource platform 206 with any of the auxiliary resources the user currently has with the entity and third party servers 207. The auxiliary resource platform 206 may store the user's current auxiliary resources in the rules depository 205. The rules depository 205 may store the user's current auxiliary resources and rules associated with the exchanges the user may be involved in on the platform.

The user may then perform a transaction with the auxiliary resources and/or perform an exchange or loan across the platform. In some embodiments, the user may perform a transaction using one or more auxiliary resources. In this way, the auxiliary resources may be transmitted to a third party server 207 in a true value, such that the auxiliary resources may be utilized for a transaction for a product or service the user is transacting for. In some embodiments, the user may perform an exchange or loan across the auxiliary resources platform 206 to one or more various user devices 204. As such, the user may be able to exchange or loan auxiliary resources to other users for terms, such as interest over a period of time.

The user device 204 may interact and connect with the auxiliary resource platform 206 with the user facing virtual system 208 in order to provide a visual interactive display for the user to interact with the auxiliary resources platform 206.

Currently, auxiliary resources are associated with various resource distribution devices, resource accounts, or the like. As advancements occur, more and more deferred resource are being provided as rewards for user appreciation, actions, or the like.

The invention comprises a universal auxiliary resources platform that allows access to all user auxiliary resources and allows the user to apply the auxiliary resources across various applications. Doing so, the system may convert or scale the auxiliary resources across the platform such that they are valued the same as when received. For example, auxiliary resources from Entity A may have a value of X, while auxiliary resources from Entity B may have a true value of Y. When the system applies both sets of auxiliary resources to the same future action, they maintain their original true value.

Furthermore, the system allows for transmission of auxiliary resources in real time to complete standard resource transaction. In this way, the auxiliary resources associated with the user on the platform may act as a secondary tier virtual resource account for transaction fulfillment or partial transaction fulfillment.

Along with transaction fulfillment, the platform allows for the user to lend or exchange auxiliary resources across users. In some embodiments, the lending may be exchanged anonymously across the platform. The user may be able to provide an amount of auxiliary resources they desire to exchange and include a percentage interest rate associated with the exchange. A second user may accept the exchange and the interest rate terms. The platform may distribute the auxiliary resources to the second user upon acceptance. This way, the user can set up terms for exchanging between users. For example, if a user is planning on using auxiliary resources a year from now, the user can exchange or lend the user's auxiliary resources now, with the terms of getting re-payment with interest before the user's planned use of the auxiliary resources.

The platform provides auxiliary resources "interest" bearing and allows for more complex activities with a mechanism to operate via the platform. The platform allows participation of known/unknown individuals to push/pull from a pool. Each user is given a user identification to shield them from the others. The platform is also used for exchanges, to trade non-tangibles and attach auxiliary resources. An auxiliary resources could be tagged as 'a verifiable ID' and sent in addition to a payment for a transaction. This user can choose to decline or participate by sending a encoded information back as a verified secondary authentication. For example, User 1 has 20,000 auxiliary resource units, User 1 is able to exchange or lend User 2 the auxiliary resources. The platform contains an internal mechanism that takes User 1 auxiliary resources and transmits them to User 2 account. The platform then re-designate any or all of User 2 new accrued auxiliary resources to User 1 account based on an agreed transfer rate and expiry. Furthermore, User 1 could create a pool of recipients to make a larger interest sum.

In other embodiments, the platform allows for pooling of auxiliary resources at the household level and the ability to transfer those auxiliary resources across the pool of users.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for an auxiliary resource platform, the system comprising:
    a memory device with computer-readable program code stored thereon;
    a communication device, wherein the communication device is configured to establish operative communication with a plurality of networked devices via a communication network;
    a processing device operatively coupled to the memory device and the communication device, wherein the processing device is configured to execute the computer-readable program code to:
        generate a unique identification for a user authorized on the auxiliary resource platform;
        extract and store user acquired auxiliary resources within a user account associated with the unique identification for the user on the auxiliary resource platform;
        allow user access to the auxiliary resource platform via a user facing virtual system;
        generate and allow for a communicable linkage across the user and user connections to create a community of users accessing the auxiliary resource platform of the user;
        provide a pooled auxiliary resource account to the user, wherein the pooled auxiliary resource account includes user acquired auxiliary resources associated with the user account and user connection acquired auxiliary resources associated with user connection accounts;
        present the user acquired auxiliary resources and pooled auxiliary resources to the user via the auxiliary resource platform via the user facing virtual system during a current transaction with a third party, wherein the user acquired auxiliary resources and the pooled auxiliary resources are presented with a true value for the current transaction with the third party;
        process user instruction for use of one or more of the user acquired auxiliary resources and pooled auxiliary resources to satisfy a portion of the resources required for completing the transaction with the third party and process instructions for exchange and terms associated with the exchange for real-time processing of the transaction using auxiliary resources for a portion of resource requirements; and
        complete user instruction by providing exchange or resource distribution to third party.

2. The system of claim 1, wherein processing user instruction for exchange and terms associated with the exchange further comprises allowing the user to select terms for anonymous distribution of auxiliary resources to other users on the auxiliary resource platform for a term with interest.

3. The system of claim 1, wherein processing user instruction for real-time processing of the third party transaction using auxiliary resources further comprises transmitting a true value to a third party for completion of a standard transaction in real-time using auxiliary resources.

4. The system of claim 1, further comprising identifying a true value for the acquired auxiliary resources, wherein the true value for the acquired auxiliary resources may include a percentage or money value for each of the auxiliary resources.

5. The system of claim 1, wherein extracting and storing user acquired auxiliary resources further comprises extracting user acquired auxiliary resources from third party entities and user input.

6. The system of claim 1, wherein extracting and storing user acquired auxiliary resources further comprises continually updating user acquired auxiliary resources on the user account.

7. The system of claim 1, wherein generating a unique identification for a user authorized on the auxiliary resource platform further comprises enrolling and authenticating the user onto the auxiliary resource platform, wherein the unique identification for the user is associated with an account on the auxiliary resource platform storing user auxiliary resources.

8. A computer program product for an auxiliary resource platform, the computer program product comprising at least one non-transitory computer-readable medium having computer-readable program code portions embodied therein, the computer-readable program code portions comprising:
an executable portion configured for generating a unique identification for a user authorized on the auxiliary resource platform;
an executable portion configured for extracting and storing user acquired auxiliary resources within a user account associated with the unique identification for the user on the auxiliary resource platform;
an executable portion configured for allowing user access to the auxiliary resource platform via a user facing virtual system;
an executable portion configured for generating and allowing for a communicable linkage across the user and user connections to create a community of users accessing the auxiliary resource platform of the user;
an executable portion configured for providing a pooled auxiliary resource account to the user, wherein the pooled auxiliary resource account includes user acquired auxiliary resources associated with the user account and user connection acquired auxiliary resources associated with user connection accounts;
an executable portion configured for presenting the user acquired auxiliary resources and pooled auxiliary resources to the user via the auxiliary resource platform via the user facing virtual system during a current transaction with a third party, wherein the user acquired auxiliary resources and the pooled auxiliary resources are presented with a true value for the current transaction with the third party;
an executable portion configured for processing user instruction for use of one or more of the user acquired auxiliary resources and pooled auxiliary resources to satisfy a portion of the resources required for completing the transaction with the third party and process instructions for exchange and terms associated with the exchange for real-time processing of the transaction using auxiliary resources for a portion of resource requirements; and
an executable portion configured for completing user instruction by providing exchange or resource distribution to third party.

9. The computer program product of claim 8, wherein processing user instruction for exchange and terms associated with the exchange further comprises allowing the user to select terms for anonymous distribution of auxiliary resources to other users on the auxiliary resource platform for a term with interest.

10. The computer program product of claim 8, wherein processing user instruction for real-time processing of the third party transaction using auxiliary resources further comprises transmitting a true value to a third party for completion of a standard transaction in real-time using auxiliary resources.

11. The computer program product of claim 8, further comprising an executable portion configured for identifying a true value for the acquired auxiliary resources, wherein the true value for the acquired auxiliary resources may include a percentage or money value for each of the auxiliary resources.

12. The computer program product of claim 8, wherein extracting and storing user acquired auxiliary resources further comprises extracting user acquired auxiliary resources from third party entities and user input.

13. The computer program product of claim 8, wherein extracting and storing user acquired auxiliary resources further comprises continually updating user acquired auxiliary resources on the user account.

14. A computer-implemented method for an auxiliary resource platform, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
generating a unique identification for a user authorized on the auxiliary resource platform;
extracting and storing user acquired auxiliary resources within a user account associated with the unique identification for the user on the auxiliary resource platform;
allowing user access to the auxiliary resource platform via a user facing virtual system;
generating and allowing for a communicable linkage across the user and user connections to create a community of users accessing the auxiliary resource platform of the user;
providing a pooled auxiliary resource account to the user, wherein the pooled auxiliary resource account includes user acquired auxiliary resources associated with the user account and user connection acquired auxiliary resources associated with user connection accounts;
presenting the user acquired auxiliary resources and pooled auxiliary resources to the user via the auxiliary resource platform via the user facing virtual system during a current transaction with a third party, wherein the user acquired auxiliary resources and the pooled auxiliary resources are presented with a true value for the current transaction with the third party;
processing user instruction for use of one or more of the user acquired auxiliary resources and pooled auxiliary resources to satisfy a portion of the resources required for completing the transaction with the third party and process instructions for exchange and terms associated with the exchange for real-time processing of the transaction using auxiliary resources for a portion of resource requirements; and
completing user instruction by providing exchange or resource distribution to third party.

15. The computer-implemented method of claim 14, wherein processing user instruction for exchange and terms associated with the exchange further comprises allowing the user to select terms for anonymous distribution of auxiliary resources to other users on the auxiliary resource platform for a term with interest.

16. The computer-implemented method of claim 14, wherein processing user instruction for real-time processing of the third party transaction using auxiliary resources further comprises transmitting a true value to a third party for completion of a standard transaction in real-time using auxiliary resources.

17. The computer-implemented method of claim 14, further comprising identifying a true value for the acquired auxiliary resources, wherein the true value for the acquired auxiliary resources may include a percentage or money value for each of the auxiliary resources.

* * * * *